United States Patent [19]

Pfarrer

[11] 3,995,199

[45] Nov. 30, 1976

[54] COMPRESSOR MOTOR PROTECTION

[75] Inventor: David M. Pfarrer, Hurst, Tex.

[73] Assignee: Lennox Industries Inc., Marshalltown, Iowa

[22] Filed: Aug. 25, 1975

[21] Appl. No.: 607,714

[52] U.S. Cl. .......... 317/13 R; 317/60 R; 317/135 R

[51] Int. Cl.² .......... H02H 7/08

[58] Field of Search .......... 317/13 R, 13 A, 60, 317/135, 136, 137; 219/10.55 C

[56] References Cited

UNITED STATES PATENTS

| | | | |
|---|---|---|---|
| 2,697,195 | 12/1954 | Courtney | 317/13 R X |
| 3,656,023 | 4/1972 | Hadfield | 317/13 R |
| 3,699,300 | 10/1972 | Buerki | 219/10.55 C |
| 3,898,527 | 8/1975 | Cawley | 317/135 R X |

*Primary Examiner*—Harry Moose

[57] ABSTRACT

An improved circuit for protecting the motor of a refrigerant compressor includes first and second magnetic contactors which are connected between a source of three-phase AC voltage and the compressor motor. The contactors are normally operated simultaneously so that each of the contactors is periodically opened and closed in accordance with the demands for operation of the compressor motor. If one of the contactors fails in the closed position, the other contactor will open to protect the compressor motor. This result is accomplished through use of a high impedance relay coil provided in parallel with contactor switches in the common line to the compressor motor and a normally closed switch actuated thereby in the control circuit, whereby if one of the contactors should stick closed, the high impedance relay coil can be energized to open the normally closed switch and prevent compressor motor operation and possible damage to the compressor motor.

10 Claims, 1 Drawing Figure

COMPRESSOR MOTOR PROTECTION

BACKGROUND AND SUMMARY OF THE INVENTION

This invention relates to refrigerant compressor motor protection and, more particularly, relates to apparatus for more reliably protecting the electric drive motor of a refrigerant compressor.

A variety of devices have been produced for the purpose of protecting three-phase AC motors. Some of these devices include the provision of first and second switches arranged so that the first switch will open to disconnect the motor from its voltage source in the event that the second switch fails in the closed position.

One such device is illustrated in U.S. Pat. No. 2,470,257 (Moore — May 17, 1949), which illustrates a protection circuit in which a main or working contactor normally controls the flow of electrical current to a three-phase motor. A safety switch is normally closed and is opened only if the working contactor fails in the closed position. The present invention provides an improvement over such arrangement. A normally closed safety switch has a tendency to stick in the closed position due to wear and contamination. Contamination may result from different sources, for example, insect juices, which are sticky and glue-like. As a result, after a period of time in field service, the safety switch may become ineffective and useless as a safety switch.

In order to overcome the deficiencies of the prior art, it has been suggested that the compressor motor can be protected by two contactors connected in series between the motor and a source of AC voltage, which contactors are both normally opened and closed in response to a demand for operation of the motor. By periodically opening and closing both of the contactors, the overall arrangement is less susceptible to failure in field service. See, the copending application of Richard E. Cawley, Ser. No. 483,293 filed June 26, 1974, now U.S. Pat. No. 3,898,527. The present invention provides another solution utilizing two contactors which enhances protection reliability.

A principal object of the present invention is to provide an improved compressor motor protection apparatus embodying first and second contactors connected between a compressor motor and an AC source, which contactors are normally both opened and closed in response to demand for operation of the compressor motor, and including auxiliary high impedance relay means for preventing operation of the compressor motor in the event one contactor fails closed.

It is another object of the present invention to provide an improved circuit arrangement of the foregoing type in which the coil of the high impedance relay means is energized in response to failure of one contactor to open a normally closed contact in a control circuit and thereby, prevent operation of the second contactor and possible damage to the compressor motor.

A circuit protection arrangement of the foregoing type offers a number of advantages, including magnification of system reliability. For example, if the first contactor is 99.5 percent reliable from the standpoint of failing in the closed position, the odds for causing a compressor failure by using the first contactor alone would be 0.5 percent or 1 in 200. However, if a 99.5 percent reliable second contactor is operatively connected for simultaneous operation with the first contactor, the odds of a compressor failure are greatly reduced, since both switches would have to fail closed. The likelihood of a failure under these circumstances would be $$\frac{1}{200} \times \frac{1}{200} = \frac{1}{40,000}.$$

In other words, if the first and second contactors are both 99.5 percent reliable from the standpoint of failing closed, the use of two such contactors improves the system reliability by a factor of 200.

Using first and second contactors operable simultaneously also virtually eliminates failures resulting from specific problems associated with a particular contactor manufacturer. By using two contactors, one of the contactors can be supplied from one manufacturer and the other contactor from another manufacturer. As a result, if one of the manufacturers has a problem associated with its contactor, for example, contact or switch sticking, whereas the other manufacturer does not, the use of both contactors and the auxiliary high impedance relay means would prevent compressor failure.

These and other object and advantages of the present invention will be made more apparent in the specification hereinafter.

BRIEF DESCRIPTION OF THE DRAWING

There is disclosed in the accompanying drawing a presently preferred embodiment of the present invention wherein.

DETAILED DESCRIPTION OF THE PREFERRED EMBODIMENT OF THE INVENTION

Figure 1:
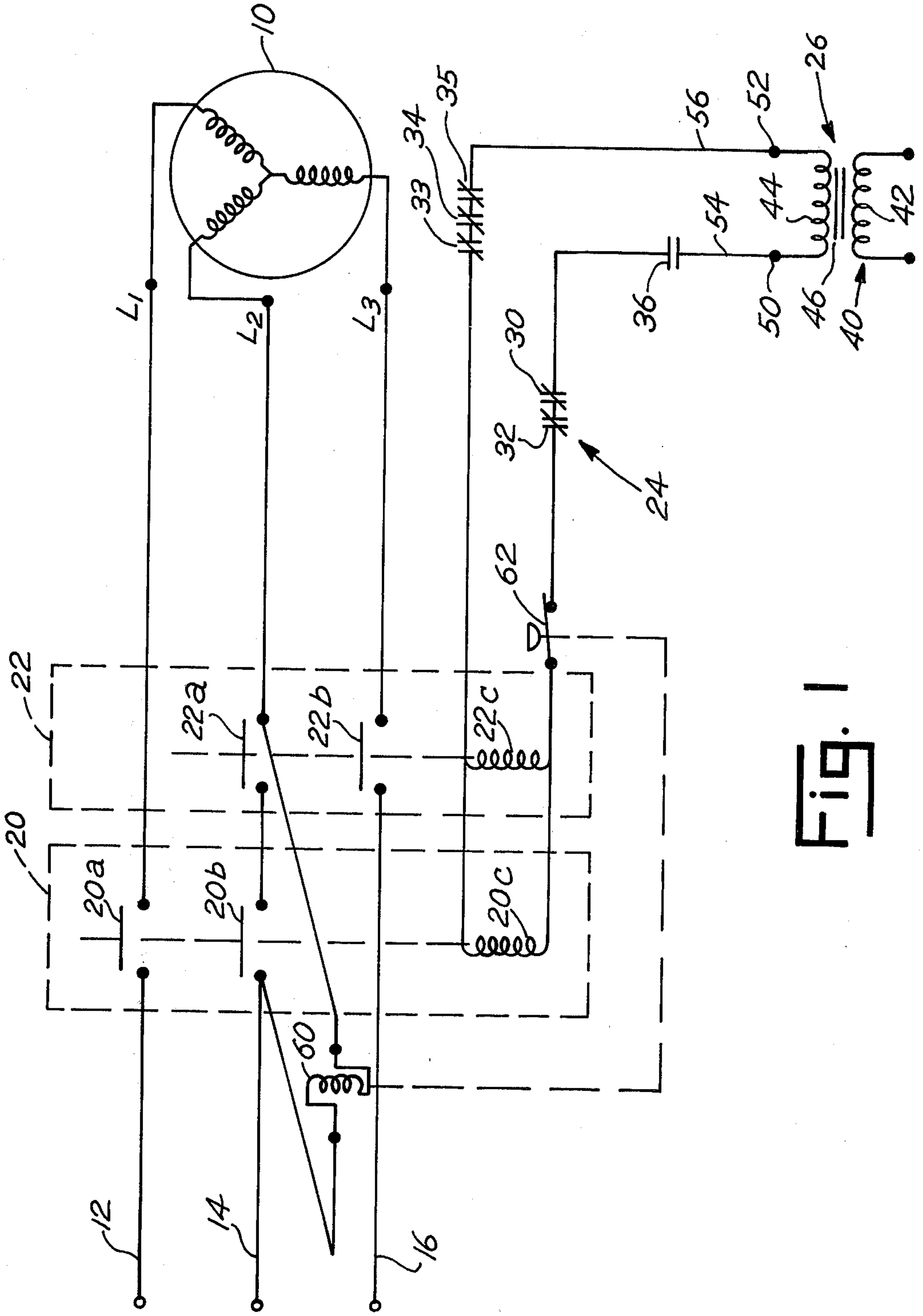
FIG. 1 is a schematic drawing of a compressor motor protection circuit embodying the principles of the present invention.

Referring to FIG. 1, there is illustrated a schematic diagram of a compressor motor protection circuit embodying the principles of the present invention. The motor 10 is a conventional three-phase compressor motor that is adapted to be disposed within a hermetic compressor for driving the compression mechanism therein. Three-phase sixty cycle AC current is received by the motor from power supply lines 12, 14 and 16. The basic components of the circuit of the present invention includes a first contactor 20, a second contactor 22, a pilot circuit 24, and a generator circuit 26.

The first contactor 20 comprises a magnetic contactor having normally open switch **20*a* in power line 12, and normally open switch 20*b* in power line 14, with the switches being controlled by an operating coil 20*c*. The second contactor 22 comprises a magnetic contactor having a first normally open switch 22*a* in the power supply line 14 in series with the switch 20*b* and a second normally open switch 22*b* in power line 16. The switches 22*a* and 22*b* are controlled by an operating coil 22*c*.**

Provided in the pilot or operating circuit 24 is a low pressure switch 30 which is adapted to be opened when the pressure in the suction line of the refrigeration system in which the compressor is used decreases below a predetermined value and a high pressure switch 32 which is adapted to be opened when the pressure in the discharge line of the refrigerant system exceeds a predetermined value. Other safety switches may be included in the pilot circuit, as for example, winding thermostats 33, 34 and 35 for protection against motor winding overheating. Also, included in the pilot or operating circuit 24 is a normally open thermostatic switch 36 which is adapted to be closed when the environment temperature rises above a predetermined desired temperature and which is opened whenever the desired temperature is attained. The switch 36 may be a conventional thermostat of the type comprising a mercury ball enclosed in a glass envelope which is mounted on a bimetallic coil that rotates the envelope in response to temperature variation in the environment.

The generating circuit 26 comprises a step down transformer 40 including a primary 42, which is magnetically coupled to a secondary 44 by a core 46. Secondary 44 steps down the primary source to 24 volt AC measured across the terminals 50, 52. The signal generated by the secondary 44 is a pilot signal which is conducted through the pilot circuit 24 by means of the conductors 54,56.

The auxiliary means for preventing operation of the compressor motor 10 in the event of the failure of the first or second contactors 20 and 22 comprises a high impedance coil 60 disposed in parallel to the switches 20*b* and 22*a* and a contact 62 operatively coupled to the coil 60 and disposed within the pilot circuit. The contact or switch 62 is normally closed and is mechanically coupled to the coil 60 so as to be opened thereby when the coil 60 is energized.

The embodiment shown in FIG. 1 operates in the following manner. Assuming that the contactors and switches are in their normal positions as shown in FIG. 1, no electrical current is transmitted through the power supply lines 12, 14 and 16 to the motor 10. When the temperature in the environment being controlled exceeds the predetermined value established by the thermostatic switch 36, the switch 36 closes so that a pilot signal may be conducted through the operating coils 20*c* and 22*c*. Energization of the operating coils 20*c* and 22*c* will cause simultaneous operation of the switches 20*a*, 20*b*, and 22*a*, 22*b*, respectively. The switches will close substantially simultaneously and three-phase current will be transmitted through the power supply lines 12, 14 and 16 to the windings of the motor 10. With the compressor motor 10 operating, the compressor will be operative and the temperature of the environment being controlled will decrease.

As soon as the temperature in the environment being controlled decreases below a value determined by the setting of the thermostatic switch 36, the switch 36 will open so that the pilot signal is no longer transmitted through operating coils 20*c* and 22*c*. As a result, the switches 20*a*, 20*b*, and 22*a*, 22*b* are opened and the operation of the compressor motor 10 is terminated.

In the event that one of the contactors, for example, contactor 22, should fail such that the switches 22*a* and 22*b* thereof remain closed, even though thermostat 36 indicates there is no longer a demand for cooling and coil 22*c* is deenergized, a circuit is completed through the relay coil 60 via power line 14, coil 60, motor 10, switch 22*b* and power line 16, which will energize the high impedance coil 60 and thereby, open the normally closed switch 62 and the pilot circuit 24. The next time that there is a demand for cooling, and the thermostatic switch 36 is closed, the compressor motor 10 cannot be operated because the switch 62 in the pilot circuit is open and the operating coils 20*c* and 22*c* cannot be energized. The switch 62 is adapted to be manually reset after opening so as to prevent undesirable cycling of one contactor in the event of failure of the other contactor.

It should be noted that the impedance of coil 60 is relatively high with respect to the impedance of the windings of the compressor motor 10. Normally, when the thermostatic switch 36 opens, the contactor coils 20*c* and 22*c* are deenergized and the switch means 20*a*, 20*b*, and 22*a*, 22*b* are opened simultaneously and rapidly to prevent energization of the high impedance coil 60. Similarly, when the thermostatic switch 36 is closed, the contactor coils 20*c* and 22*c* are energized and the switch means 20*a*, 20*b*, and 22*a*, 22*b* are opened simultaneously and rapidly to prevent energization of the high impedance coil 60. The high impedance coil 60 will only be energized when one of the contactor switch means fails to function and is, thereby, in the closed position.

If the relay coil 60 tends to pick up or be actuated too quickly, it is possible to add a time delay circuit to the relay coil; however, preliminary tests indicate this is not necessary.

The present invention provides a novel solution to the problem of the sticking of a compressor motor contactor. Applicant has provided a two contactor arrangement with auxiliary means associated therewith including a high impedance coil which will prevent damage to the motor windings in the event one of the contactors fails in use.

Those skilled in the art will recognize that the presently preferred embodiment is merely exemplary of the present invention and may be altered or modified without departing from the true spirit and scope of the invention as defined in the appended claims.

I claim:

1. A protection circuit for a refrigerant compressor motor comprising power supply lines to the compressor motor including a common line, first and second contactors operable substantially simultaneously to control energization and deenergization of said compressor motor including first and second normally open switch means in said power supply line, a control circuit including third switch means and first and second contactor coils, and auxiliary means for preventing operation of the compressor motor in the event of failure of the first or second contactors, said auxiliary means comprising a high impedance coil in circuit with the common line and normally closed fourth switch means in the control circuit operated by said high impedance coil, said high impedance coil being energized, upon failure of a contactor to open when the third switch means is opened, to open the fourth switch means in the control circuit and deenergize the operative contactor so as to prevent operation of the compressor motor even if the third switch means is reclosed.

2. A circuit as in claim 1 wherein the fourth switch means are manually reset after opening to prevent undesirable cycling of the second contactor after failure of the first contactor.

3. A circuit as in claim 1 wherein the power supply lines are connected to a three-phase power supply, said first switch means including switches in a first power supply line and said common line and said second switch means including switches in said common line and a second power supply line.

4. A circuit as in claim 1 wherein said third switch means comprises a normally open switch that is closed in response to a demand for operation of the compressor motor so as to energize the first and second contactor coils and close the first and second switch means to energize the compressor motor.

5. A circuit as in claim 1 wherein the impedance of the high impedance coil is relative to the impedance of the windings of the compressor motor and wherein normally, when the third switch means opens, the contactor coils are deenergized and the first and second switch means open simultaneously and rapidly to prevent energization of the high impedance coil.

6. A circuit as in claim 5 wherein normally, when the third switch means closes, the contactor coils are energized and the first and second switch means close simultaneously and rapidly to prevent energization of the high impedance coil.

7. A circuit as in claim 1 wherein the first switch means include a switch located in one supply line and a switch in the common line and the second switch means include a switch in the second supply line and a switch in the common line in series with the switch of the first switch means, the high impedance coil being connected in parallel with the two switches in the common line.

8. A circuit as in claim 1 wherein the third switch means comprises a thermostatic switch responsive to temperature in the environment to be controlled.

9. A circuit as in claim 8 wherein the impedance of the high impedance coil is high relative to the impedance of the windings of the compressor motor and wherein when the third switch means opens the first and second contactor coil are deenergized and the first and second switch means are opened simultaneously and quickly to prevent energization of the high impedance coil and undesired opening of the fourth switch means and when the third switch means closes, the first and second switch means are closed simultaneously and quickly to prevent energization of the high impedance coil and undesired opening of the fourth switch means.

10. A circuit as in claim 1 wherein the first and second switch means are actuated simultaneously and quickly to prevent undesirable energization of the high impedance coil during normal operation of the first and second contactors.

* * * * *